(12) United States Patent
Ng et al.

(10) Patent No.: US 9,731,237 B2
(45) Date of Patent: Aug. 15, 2017

(54) NONWOVEN FABRIC, METHOD FOR PRODUCING THE SAME, AND FILTER FORMED WITH THE SAME

(75) Inventors: Ying Yuk Ng, Hong Kong (CN); Gilbert Craig, Wallingford, CT (US)

(73) Assignee: FAIRTECH INVESTMENT LIMITED, Wanchai (HK)

( * ) Notice: Subject to any disclaimer, the term of this patent is extended or adjusted under 35 U.S.C. 154(b) by 0 days.

(21) Appl. No.: 13/378,720

(22) PCT Filed: Feb. 28, 2011

(86) PCT No.: PCT/CN2011/071371
§ 371 (c)(1),
(2), (4) Date: Mar. 2, 2012

(87) PCT Pub. No.: WO2012/048545
PCT Pub. Date: Apr. 19, 2012

(65) Prior Publication Data
US 2013/0193063 A1    Aug. 1, 2013

(30) Foreign Application Priority Data
Oct. 14, 2010  (WO) ............... PCT/CN2010/077735

(51) Int. Cl.
*B01D 39/16* (2006.01)
*D04H 1/72* (2012.01)
(Continued)

(52) U.S. Cl.
CPC ............ *B01D 39/163* (2013.01); *B29C 65/02* (2013.01); *D04H 1/485* (2013.01); *D04H 1/492* (2013.01); *D04H 1/54* (2013.01); *D04H 1/541* (2013.01); *D04H 1/544* (2013.01); *D04H 1/72* (2013.01); *B01D 2239/0478* (2013.01);
(Continued)

(58) Field of Classification Search
CPC .......... B01D 39/163; B01D 2239/0636; B01D 2239/1291; B01D 2239/065; B01D 2239/064; B01D 2239/0478; B01D 2239/10; D04H 1/492; D04H 1/544;
(Continued)

(56) References Cited

U.S. PATENT DOCUMENTS 4,931,178 A * 6/1990 Manniso et al. ............... 210/228
5,532,050 A * 7/1996 Brooks ................. B29C 43/006
156/296

(Continued)

FOREIGN PATENT DOCUMENTS

CN    101332385 A    12/2008
CN    101678255 A    3/2010

*Primary Examiner* — Madeline Gonzalez
(74) *Attorney, Agent, or Firm* — NYEMaster Goode P.C.

(57) ABSTRACT

The present invention provides a novel nonwoven felt fabric, which is made of at least one low-melting-point short fiber and at least one high-melting-point short fiber of same type or different types, wherein the fabric is stiff enough to be self-sustaining and have the ability of shape maintenance. The felt fabric exhibits excellent pleatability, moldability and compressive strength. The invention also provides a method for producing the felt fabric, and a filter comprising the felt fabric used as the material of a filter medium of the filter, wherein the filter medium requires no support structure to stand alone and persistently retains its shape.

29 Claims, 8 Drawing Sheets

(51) Int. Cl.
    *D04H 1/485*     (2012.01)
    *D04H 1/492*     (2012.01)
    *D04H 1/54*     (2012.01)
    *B29C 65/02*     (2006.01)
    *D04H 1/544*     (2012.01)
    *D04H 1/541*     (2012.01)

(52) U.S. Cl.
    CPC .. *B01D 2239/064* (2013.01); *B01D 2239/065* (2013.01); *B01D 2239/0636* (2013.01); *B01D 2239/10* (2013.01); *B01D 2239/1291* (2013.01)

(58) Field of Classification Search
    CPC .......... D04H 1/72; D04H 1/485; D04H 1/541; D04H 1/54; B29C 65/02
    USPC ......... 210/486, 505, 500.1, 496, 493.2, 508, 210/488, 493.5, 490, 491, 331, 224, 227, 210/231, 230, 541; 156/148, 296; 19/145.7
    See application file for complete search history.

(56) References Cited

U.S. PATENT DOCUMENTS

2003/0222014 A1* 12/2003 Nakajima ..................... 210/490
2009/0050578 A1* 2/2009 Israel et al. ................... 210/767
2011/0114554 A1* 5/2011 Li ..................... B01D 39/1623
                                                                                             210/493.5

* cited by examiner

NONWOVEN FABRIC, METHOD FOR PRODUCING THE SAME, AND FILTER FORMED WITH THE SAME

FIELD OF THE INVENTION

This invention relates to a nonwoven fabric, a method for producing the nonwoven fabric, and a filter comprising the nonwoven fabric used as the material of a filter medium of the filter. The nonwoven fabric according to the invention exhibits excellent hardness and stiffness, moldability, and compressive strength.

BACKGROUND OF THE INVENTION

Nonwoven fabric is a cloth that is neither woven nor knitted. In fact, the nonwoven fabric is made by entangling randomly or directionally short fibers or long fibers (long filaments) to form a web structure and then bonded together mechanically, thermally, or chemically. In short, the nonwoven fabric is not based on yarn-by-yarn weaving or knitting, but is based on physical bonding of the fibers together. The nonwoven fabric represents a breakthrough in the conventional textile industry, and is characterized by short flow process, fast production rate, high output, low costs, wide adaptability, ease of acquirability of raw materials and the like.

Figure 1:
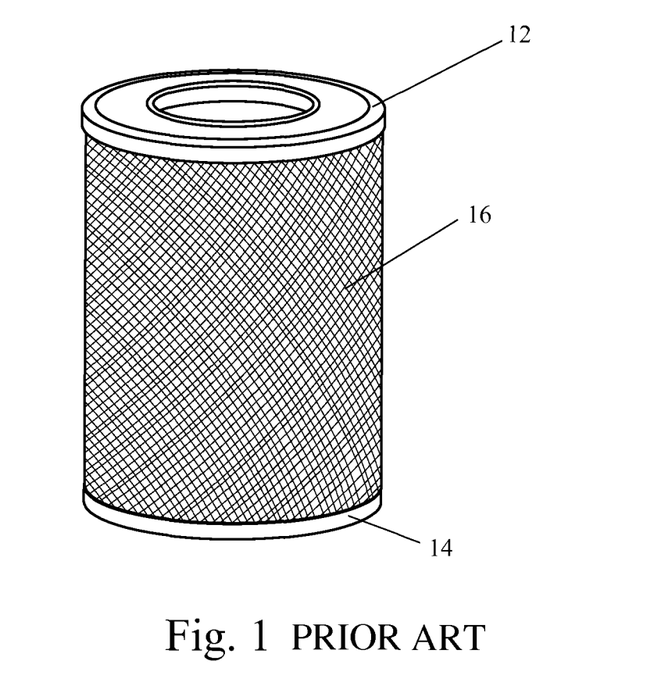
FIG. 1 is a schematic diagram of a cartridge filter available in the prior art.

The nonwoven fabric exhibits good filterability, permeability and absorption, and therefore is suitable to be used as a filter medium. For example, the nonwoven fabric may be used in the bag filters and the cartridge filters. However, conventional nonwoven fabrics are generally soft and require a supporting frame for mounting on the filter. FIG. 1 illustrates a cartridge filter of the prior art, comprising two circular end caps 12, 14, a net-shaped supporting frame 16 between the two end caps, and a filter medium made of the prior art nonwoven fabric mounted on an inner or outer side or both sides of the net-shaped supporting frame. This structure would increase the costs and is labor intensive in mounting and changing the filter because of the supporting frame; on the other hand, the performance of the filter medium may be diminished more or less because the net-shaped supporting frame can block the contact between the filter medium and the fluids to be treated, or cause deposit of dusts and/or pollutants. Thus, some efforts have been made in order to increase the stiffness or flexural stiffness of the nonwoven fabric.

Chinese patent application no. CN101678255A with the publication date of 24 Mar. 2010 has disclosed a long fiber nonwoven fabric made of synthetic fibers and a cylindrical bag filter made from the long fiber nonwoven fabric, wherein the long fiber nonwoven fabric is made of thermoplastic continuous filaments and is partially thermocompression-bonded. The long fiber nonwoven fabric has a circular arc flexural stiffness per basis weight of 0.050 to 1.000 $((cN/2\ cm)/(g/m^2))$, and an air permeation rate per basis weight of 0.010 to 0.500 $((cc/cm^2/sec)/(g/m^2))$. The long fiber nonwoven fabric disclosed in this patent application is a spunbond nonwoven fabric, and produced from a method comprising the steps of melt-extruding a thermoplastic polymer through a spinneret, sucking and drawing the extrudate with an air sucker to from thermoplastic continuous filaments, allowing the filaments to be subjected to electrification opening and to be piled on a moving collection surface to form a fiber web, and allowing the fiber web to be subjected to pressure welding treatment with a flat roll and partially thermocompression-bonding the fiber web with hot embossing rolls to form the long-fiber nonwoven fabric. The obtained long fiber nonwoven fabric has good flexural stiffness, and is suitable to be used as the material of a bag filter since it exhibits excellent shape maintenance after backwashing air. However, this patent application indicates that the nonwoven fabric made of short fibers such as a conventional felt is poor in stiffness of the sheet and thus it is unsuitable. Although the long fiber nonwoven fabric disclosed in this patent application has a relative stiffness, the stiffness is enough to retain its shape only for the filters of small size (for example 30 cm) but the supporting frame is still required. For the filters of large size (for example 1 m or above), the long fiber nonwoven fabric is not capable of retaining its shape. In other words, such a nonwoven fabric is not self-sustaining.

A filter material of an air filter applied to a central ventilation system is disclosed in another Chinese patent application no. 101332385A. The filter material mainly comprises an upper layer of nonwoven fabric and a lower layer of nonwoven fabric as a substrate, and one or more composite layer(s) that is/are compounded between the upper and lower layers of nonwoven fabric. The filter material is characterized in that the composite layer is formed by sandwiching a layer of granular activated carbons between two layers of fiber cementing compound, wherein the layer of granular activated carbons consists of independent activated carbon granules spreading on one-by-one basis. The filter material is not only efficient and has low resistivity, but also maintains the adsorption performance of the activated carbons. Furthermore, the filter material maintains the hardness and stiffness required for the purpose of ventilation. Although this patent application does not mention which type the two layers of nonwoven fabric are, the filter material is composed by attaching the two nonwoven fabric layers to the intermediate composite layer, in such a manner that the hardness and the stiffness of the material are controlled by adjusting the amount of the activated carbons and the amount of the cementing compound to cater for the requirement of pleat processing. However, the filter material disclosed in this patent application is structurally complicated and not environmentally benign due to the use of cementing compound. In addition, the filtration performance of the filter material can be diminished when the activated carbons or some pores of the nonwoven fabric are blocked.

Moreover, currently available felt fabrics are texturally soft and pleats cannot be made thereon. Therefore, they cannot be used to produce a pleat-shaped filter in order for increased filtration area. The currently available felt fabrics do not have the mouldability, namely cannot be moulded into various shapes or configurations or cannot retain its shapes and configurations after it is moulded.

There has been no pleatable felt that has a stiffness sufficient for shape maintenance, exhibits excellent moldability, and is self-sustaining in the prior art. It has also not been found in the prior art that a pleat-shaped filter comprises a filter medium made of the felt, which is self-sustaining without the need of a supporting structure.

SUMMARY OF THE INVENTION

An object of the present invention is to provide a nonwoven felt fabric which exhibits excellent hardness and stiffness, remarkable moldability, and high compressive strength.

Another object of the present invention is to provide a method for producing the above nonwoven felt fabric and a filter comprising the felt fabric used as the material of a filter medium of the filter.

These and other objects and advantages of the invention are satisfied by providing a nonwoven felt fabric which is made of at least one low-melting-point short fiber and at least one high-melting-point short fiber of same type or different types, wherein the felt fabric is stiff enough to be self-sustaining and have the ability of shape maintenance, and the fabric is also mouldable.

The felt fabric may be produced as a single layer of fiber formed by evenly blending the low-melting-point short fiber and the high-melting-point short fiber, or produced to comprise alternately at least one layer of the low-melting-point short fiber and at least one layer of the high-melting-point short fiber.

According to the invention, the low-melting-point short fiber is heated into a molten state so that the molten low-melting-point short fiber gets tangled up in the high-melting-point short fiber, and then cooled down quickly and solidified. This enables to strengthen the interlocking between the low-melting-point and high-melting-point short fibers.

In one preferred embodiment of the invention, the felt fabric comprises two layers of high-melting-point short fiber and a layer of low-melting-point short fiber arranged therebetween.

The low-melting-point short fiber may have a melting point ranging from 115° C. to 130° C., and the high-melting-point short fiber may have a melting point ranging from 180° C. to 230° C.

Each of the low-melting-point short fiber and the high-melting-point short fiber may be selected from the group consisting of polyesters, terylene, polypropylene, nylon, acrylic, polyamide fibres, rayon fibres, acrylic fibres, polyethylene, and polyvinyl chloride.

The felt fabric according to the invention may have a shore A hardness of up to 50-80 HA.

The felt fabric can be pleatable.

The hardness of the felt fabric depends on the amount of the low-melting-point short fiber. According to the invention, the nonwoven felt fabric comprises from about 20% to 50%, preferably about 30% to 40% of the low-melting-point short fiber based on a total weight of the nonwoven felt fabric, and from about 50 to 80%, preferably about 60 to 70% of the high-melting-point short fiber based on the total weight of the nonwoven felt fabric.

Preferably, the nonwoven felt fabric is made by forming a fabric blank of the low-melting-point short fiber and the high-melting-point short fiber; subjecting the fabric blank to a heating treatment at a temperature that is higher than a melting point of the low-melting-point short fiber but lower than a melting point of the high-melting-point short fiber, so that the low-melting-point short fiber is heated into a molten state to get tangled up in the high-melting-point short fiber; and cooling down quickly and solidifying the fabric blank.

The felt fabric has a gram weight ranging from 150 g/m$^2$ to 2000 g/m$^2$.

The felt fabric may be a needle punch fabric or a water jet punch fabric.

The felt fabric of the invention is suitable to be used as a filter medium of gas-solid filters or liquid-solid filters. Thus, the invention further provides a filter comprising the felt fabric of the invention used as the material of a filter medium of the filter, wherein the filter medium is self-sustaining and requires no supporting structure.

In one embodiment of the invention, the filter is the type of cartridge filter having a cylinder formed with the felt fabric as the filter medium, and the cylinder is self-sustaining. Preferably, the cylinder is pleated to be in a pleated shape. The filter may further comprise end caps formed with the felt fabric, and the end caps are moulded to have a surface profile corresponding to a cross sectional configuration of the pleated cylinder.

In another embodiment of the invention, the filter is the type of bag filter, the felt fabric is moulded into a shape of bag as the filter medium, and the filter bag is self-sustaining; or the felt fabric is pleated and then rolled up into a shape of bag as the filter medium, and the opposite two sides of the bag are then sealed according to any method known in the art, for example, by using adhesive or stitching. The filter bag is self-sustaining.

In a further embodiment of the invention, the filter is the type of CGR plate filter, comprising a first filter element, a second filter element that is opposite to the first filter element, and a supporting plate that has a central through hole and is sandwiched between the first and second filter elements, and wherein the first and second filter elements are moulded from the felt fabric of the invention.

Each of the first and second filter elements comprises a body, an extended central core formed on the body, and a flange formed on a perimeter edge of the body, the extended central core and the flange protrude outwardly from a same side of the body. The body, the extended central core and the flange are moulded as one piece from the felt fabric. The central core of the first filter element is shaped and dimensioned such that this central core snugly passes through the central through hole of the supporting plate, and the central core of the second filter element is shaped and dimensioned such that this central core snugly passes through and is meshed with the central core of the first filter element. The flanges of the first and second filter elements are shaped and sized such that they are snugly received in a groove formed on a perimeter of the supporting plate.

In one yet embodiment of the invention, the filter is the type of rotary disc filter that is constituted of a plurality of filter sectors, each of the filter sectors comprises a first filtration wall made of the felt fabric, a second filtration wall made of the felt fabric and opposite the first filtration wall, and a filtrate chamber formed between the first and second filtration walls for receiving filtrate that flows through the first and second filtration walls. Preferably, the filter sector further comprises a supporting plate received in the filtrate chamber, the supporting plate is moulded from the nonwoven felt fabric of the invention and is profiled to radially form a plurality of channels for guiding the filtrate to flow toward a filtrate outlet.

The first and second filtration walls may be shaped such that they are meshed with each other to form a closed chamber.

The present invention also relates to a rotary disc filter comprising a plurality of supporting sectors which are clamped together to form the disc filter, and a plurality of filter bags which envelope the supporting sectors respectively, and wherein the supporting sectors are moulded from the nonwoven felt fabric of the invention. The supporting sector may be profiled to radially form a plurality of channels for guiding the filtrate to flow toward a filtrate outlet.

According to another aspect of the invention, a method for producing a nonwoven fabric of the invention is provided, comprising the steps:

1) blending evenly at least one low-melting-point short fiber and at least one high-melting-point short fiber of same type or different types in a desired ratio to obtain a single layer of fiber, or to obtain a plurality of fibers with at least one layer of low-melting-point short fiber and at least one layer of high-melting-point short fiber arranged alternately;

2) carding the blended fiber on a carding machine;

3) feeding the carded fiber into a web forming machine to produce a fiber web;

4) subjecting the fiber web to a forming treatment to form a fabric blank;

5) heating the fabric blank at a temperature that is higher than the melting point of the low-melting-point short fiber but lower than the melting point of the high-melting-point short fiber, so that the low-melting-point short fiber melts while the high-melting-point short fiber remains unmelted; and 6) cooling down the heated fabric blank to solidify the melted low-melting-point short fiber, so as to obtain the nonwoven felt fabric.

In the step of heating, the low-melting-point short fiber is melted into a molten state so that the molten low-melting-point short fiber gets tangled up in the high-melting-point short fiber, and the high-melting-point short fiber remains unmelted, thereby the fabric blank is structured by sandwiching the molten low-melting-point short fiber between the unmelted high-melting-point short fiber.

The low-melting-point short fiber may have a melting point ranging from 115° C. to 130° C., and the high-melting-point short fiber may have a melting point ranging from 180° C. to 230° C., then the heating is performed at a temperature ranging from 140° C. to 150° C., and the cooling is performed at a temperature ranging from 10° C. to 18° C.

The step of heating further comprises blowing vertically hot air to upper and lower surfaces of the fabric blank so as to allow passage of the hot air through the fabric blank, in order that the low-melting-point short fiber inside the fabric blank is better heated.

Preferably, the cooling step comprises applying a cooling roller of for example 200 kg which is gravitationally or hydraulically pressed downwardly against the fabric blank, so that the fabric blank is cooled down in a very short time.

The felt fabric may be pleated to make pleats thereon.

In step 4), the forming treatment may be selected from the group consisting of processes of needle punch, water jet punch, thermal-sealing, thermal-bonding, air-laid, wet processing and stitch bonding.

DETAILED DESCRIPTION OF THE PREFERRED EMBODIMENTS

The invention primarily relates to a nonwoven felt fabric produced by for example a needle punch method using short fibers. The felt fabric exhibits excellent hardness and stiffness. The felt fabric also has a remarkable moldability, and is capable of retaining its shape when it is molded into virtually any shape or configuration. The nonwoven felt fabric produced by the needle punch method is called needle punched felt, while a felt generally refers to a sheet which is formed by intimately bonding wools or fleeces.

The constituent materials of the nonwoven fabric can be classified into long fiber and short fiber. In brief, the long fiber is a filament like cocoon silk, and the short fiber is fleece-like or cotton-like. The long fiber is a continuous single fiber, and the fabric made from the long fibers has a gram weight of 200 to 300 $g/m^2$. The term "gram weight" represents a weight in gram per square meter of the fabric, a measure of thickness and density of the fabric which is an important technical indicator known in the textile field.

The short fiber is known as staple fiber (which is generally in length 35 to 74 mm), referring to the fibers in length corresponding to natural fibers, which are produced by cutting or stretch breaking the chemical long fiber yarn, or to the fibers produced by natural fibers such as crystal whiskers and asbestos. The short fiber used in the invention has a length of about 35 to 150 mm, and a fineness of 1.5 to 8 Denier. The short fibers can be classified into cotton, wool, carpet, and mid-length types. The short fibers can be spun exclusively or blended with natural fibers or other fibers in various ratios into yarns, fabrics or felts. Generally, the needle punched felt fabric of the invention has a gram weight of 150 to 2000 $g/m^2$.

Figure 2:
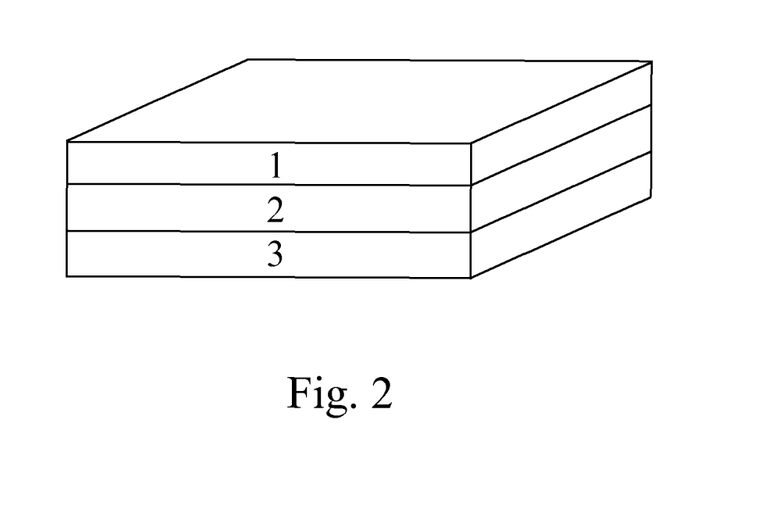
FIG. 2 is a perspective sectional view of a nonwoven felt fabric having a configuration of three layers constructed in accordance with an embodiment of the invention.

FIG. 2 illustrates a schematic diagram of the structure of the short fiber nonwoven fabric having an excellent stiffness constructed in accordance with an embodiment of the invention.

Figure 3:
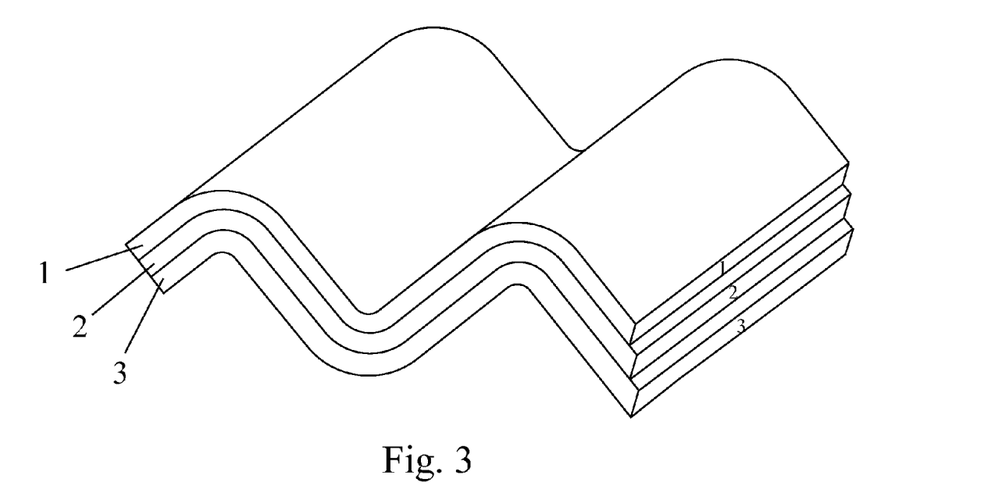
FIG. 3 is a perspective sectional view of the nonwoven felt fabric shown in FIG. 1, on which pleats are made.
Figure 4:
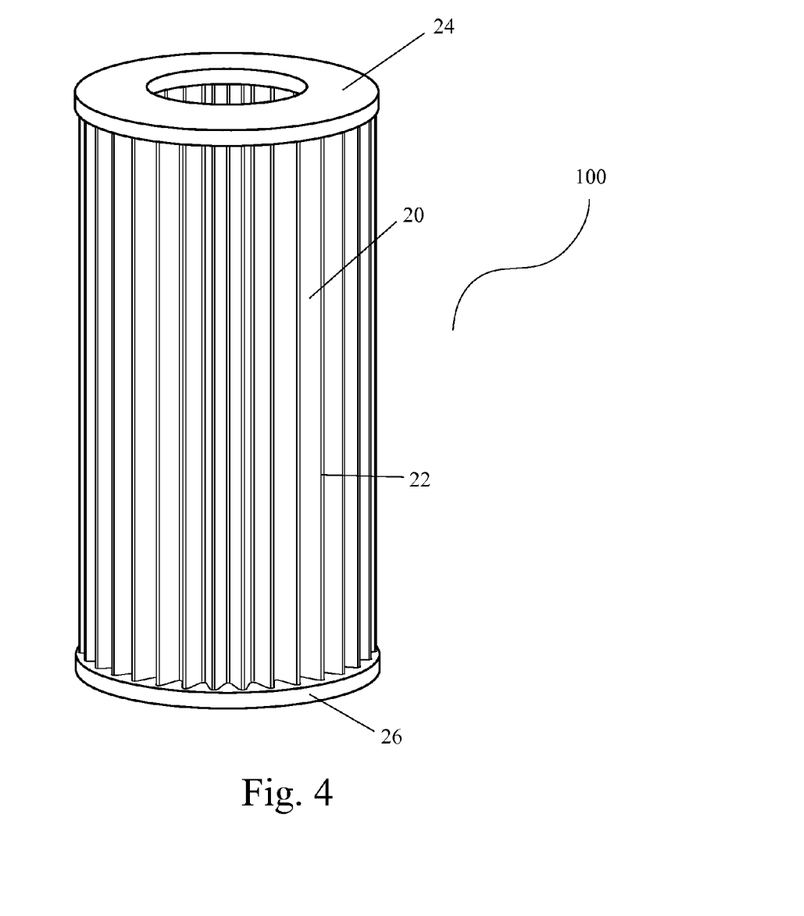
FIG. 4 is a perspective view of a cartridge filter formed with the nonwoven felt fabric of the invention.

It should be noted that FIGS. 1 and 4 are prepared respectively in scale to the prior art filter and the inventive filter, FIGS. 2 and 3 are the sectional views of the felt fabric of the invention, which are prepared schematically and out of scale. Although FIG. 2 clearly shows that the felt fabric has a configuration of three layers, in fact the interface between the layers is not so distinct, because the low-melting-point fiber and the high-melting-point fiber can be interlocked and interpenetrated. For the sake of clarity, the thickness of the fabric is relatively big with respect to the length of the surface of the fabric in FIGS. 2 and 3, but the actual thickness may be of 1 to 5 mm and the actual length may be of 1 to 2 meter.

Figure 14:
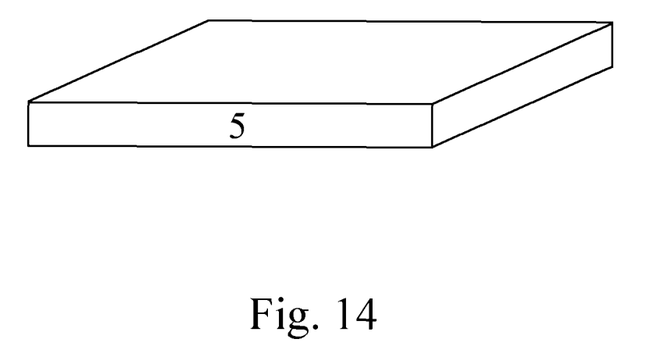
FIG. 14 is a perspective sectional view of a nonwoven felt fabric having a configuration of a single layer constructed in accordance with an embodiment of the invention.

According to the invention, the felt fabric may consist of a single layer 5 of fiber formed by evenly blending the low-melting-point short fiber and the high-melting-point short fiber (see FIG. 14). In particular, the low-melting-point short fiber and the high-melting-point short fiber in a predetermined ratio are blended evenly in a blending hopper, the blended fiber is transported to a carding machine where it is carded. The carded fiber is then fed into a web forming machine to produce a fiber web which is subjected to several rounds of needle punch treatment to form a fabric blank. The fabric blank is then subjected to a solidification treatment comprising the steps of heating the fabric blank at a temperature (for example 140° C. to 150° C.) that is higher than the melting point of the low-melting-point short fiber but lower than the melting point of the high-melting-point short fiber, so that the low-melting-point short fiber melts while the high-melting-point short fiber remains unmelted; and cooling down immediately the heated fabric blank to the temperature of 10-18° C. in a short time (for example in 5 to 15 seconds) and simultaneously applying a cooling roller of 200 kg which is gravitationally or hydraulically pressed downwardly against the fabric blank, so as to solidify the melted low-melting-point short fiber to obtain the needle punch nonwoven fabric.

The felt fabric of the invention may comprise two or more layers, in which a layer of the low-melting-point short fiber and a layer of the high-melting-point short fiber are disposed alternately. For example, the felt fabric may comprise three layers with one layer of the low-melting-point short fiber sandwiched between two layers of the high-melting-point short fiber. Of course, the nonwoven fabric of the invention may comprise more layers of short fiber, in which each layer of the fiber has a different melting point and the amount of the fiber for each layer depends on the thickness of this layer in the final product, which is determined by the particular application requirement.

The procedure for producing the felt fabric of a plurality of layers is substantially same as the procedure for producing the felt fabric of a single layer, which will be described hereinbelow.

The felt fabric shown in FIG. 2 comprises three layers of short fiber, in which the upper and lower layers 1, 3 of fiber is made from a high-melting-point short fiber having a melting point of 180° C. above, for example in the range of 190° C. to 230° C., preferably in the range of 215° C. to 230° C. or above; the intermediate layer 2 is made from a low-melting-point short fiber having a melting point ranging from 115° C. to 130° C. or below.

The layers 1, 2, 3 may be made from the short fibers of same type or different types. For instance, the layers 1, 2, 3 may be made from terylene having a melting point of 130° C. and terylene having a melting point of 230° C., respectively; or the layers 1, 2, 3 may be made from terylene having a melting point of 130° C. and polypropylene (PP) having a melting point of 1930° C., respectively.

The type of short fibers used for the layers 1, 2, 3 may be determined by the application of the felt fabric in filters, and selected from the group of polyesters, terylene, polypropylene, nylon, acrylic, polyamide fibres, rayon fibres, acrylic fibres, polyethylene, and polyvinyl chloride.

The invention is characterized in that the low-melting-point fiber is a solidifiable material, particularly is capable of solidifying after it is heated to melt, whereby the obtained felt fabric has the ability of self-sustaining and shape maintenance. The felt fabric of the invention can be moulded into various shapes according to the actual needs and has a characteristic of being persistently retaining in those shapes after it is moulded.

The melting and solidification of the low-melting-point fiber layer 2 will be discussed herein. After the three layers 1, 2, 3 of fiber are needle punched to from a fabric blank, the fabric blank is heated at a given temperature that is higher than the melting point of the low-melting-point short fiber but lower than the melting point of the high-melting-point short fiber, so that the low-melting-point short fiber is melted to get tangled up in the high-melting-point short fiber. Then the fabric blank is cooled down quickly so that the molten low-melting-point short fiber solidifies. In the heating step, a part of the molten low-melting-point short fiber in the layer 2 would penetrate into the layers 1, 3. The low-melting-point short fiber would solidify to have relatively high hardness and stiffness. The shore A hardness of the felt fabric of the invention is up to 50 to 80 HA which is measured by a Model A Shore Durometer. It is known in the art that a parameter "hardness" is a physical measure indicative of the extent of compressive deformation or the cut-resistant ability of a material.

In the case that the felt fabric has a same density, the hardness of the fabric depends on the proportion of the low-melting-point fiber contained in the fabric. The higher the proportion of the low-melting-point fiber is, the greater the hardness of the fabric is. According to the invention, the felt fabric comprises from about 20% to 50%, preferably 30% to 40%, of the low-melting-point short fiber based on a total weight of the felt fabric, and from about 50 to 80%, preferably 60% to 70%, of the high-melting-point short fiber based on the total weight of the felt fabric.

The felt fabric of the invention is capable of self-sustaining because it has high hardness and stiffness, and requires no supporting structure to stand alone, or wound not bend when it is supported over two fulcrums. Particularly, the felt fabric of the invention is capable of retaining a cylindrical shape when it is made to form a filter cylinder of the cartridge filter in length of even up to 2 meters, and does not require any supporting structure when it vertically stands alone or horizontally lies. Therefore, the supporting frame would be eliminated when mounting the filter cylinder made of the fabric of the invention onto the filter. As shown in FIG. 4, the filter does not have any supporting frame for mounting the filter cylinder, because the fabric 20 is self-sustaining and sufficient for supporting the end caps too. The prior art nonwoven felt fabrics made of short fibers are soft and less stiff, therefore cannot stand alone.

The felt fabric of the invention exhibits the excellent hardness for example having a shore A hardness of 50-80 HA, which makes it possible that pleats can be made on the fabric. This is an important feature of the needle punched felt of the invention, because the currently available felts are not pleatable. FIG. 3 illustrates the felt of the invention in pleated shape, which can be used in a filter to increase the filtration area and requires no supporting structure.

According to the invention, the layer of low-melting-point fiber is melted by heat and then solidified in a very short time, and thus may serve as a supporting layer for the felt fabric. The layer of high-melting-point fiber remains unmelted during the producing process of the felt fabric and maintains the instinct properties such as good filterability, permeability and absorption, and thus may function as a filter medium of the filter.

Another characteristic of the felt fabric of the invention is that the fabric is capable of retaining its shape when it is moulded into virtually any shape or configuration. Because of this remarkable mouldability, the felt fabric of the invention finds a wide range of applications in many fields, for example in filtration equipments. The felt fabric can be moulded into various filter elements of different shapes according to the actual needs, which will be described hereinbelow.

A further characteristic of the felt fabric of the invention is that the fabric has a high compressive strength. Even pleats are made on the felt fabric, these pleats have the high compressive strength too. Tests were performed for the compressive strength of the pleated felt fabric. In particular, the pleated felt fabric was immersed into water for 24 hours, and then taken out from water and placed on a planar surface; a vehicle of over 2 million tons keeps to run over the pleated felt fabric for many times. The results revealed that the pleated felt fabric retain the pleated shape and does not collapse. This suggests that the felt fabric of the invention even in the pleated shape has excellent impact resistance and compressive strength, and thus can withstand repeated pulsing of the cleaning air or fluids and the impact from the cleaning air or fluids, which facilitates maintaining the dimension stability of a filter medium when it is used as the material of the filter medium.

In general, the gram weight of the felt fabric according to the invention ranges from 150 g/m$^2$ to 2000 g/m$^2$. For example, a felt fabric having a gram weight of 500 g/m$^2$ may be produced by sandwiching a layer 2 of low-melting point fiber having a gram weight of about 160 g/m$^2$ between two layers 1, 3 of high-melting point fiber each having a gram weight of about 170 g/m$^2$. The upper and lower layers 1, 3 are relatively soft compared with the layer 2 and used to collect ducts. The intermediate layer 2 is relatively stiff and can play a supporting role in the felt fabric. The three layers 1, 2, 3 can be interlocked by any method known in the art, such as needle punch or water jet punch. It would be apparent to a skilled person in the art that the fabric having the same gram weight can produce fabrics of different densities.

In addition, crystalline nucleus agents, delustering agents, pigments, fungicidal agents, antibacterial agents, flame retardants, hydrophilic agents or the like can be added into the felt fabric of the invention in order for enhanced performance of the fabric or to satisfy the particular applications. Patterns or graphics can be imprinted on the felt fabric by for example an emboss roller.

The method for producing the felt fabric of the invention is described below. In general, the method comprises a step of forming a fabric blank and a step of treating the fabric blank.

The step of forming a fabric blank comprises putting the cotton-like short fibers into a carding machine for carding and then fed into a web forming machine to produce a fiber web. The fiber web may comprise a single layer of evenly blended low-melting-point and high-melting-point fibers, or comprise a plurality of layers (for instance two, three or more layers) of fibers, in which the layer of low-melting-point fiber and the layer of high-melting-point fiber are alternately superposed. Then, the fiber web is subjected to a needle punch treatment to form the fabric blank which will be used in the next step.

The step of treating the fabric blank comprises heating the fabric blank in an oven at a temperature that is higher than the melting point of the low-melting-point short fiber but lower than the melting point of the high-melting-point short fiber, so that the low-melting-point short fiber melts while the high-melting-point short fiber remains unmelted. The molten low-melting-point short fiber would get tangled up in the high-melting-point short fiber, whereby a configuration that the molten low-melting-point short fiber is arranged between the unmelted high-melting-point short fibers is created in the fabric blank. Then, the heated fabric blank is subjected to a cooling treatment to solidify the molten low-melting-point short fiber to obtain the felt fabric of the invention.

Preferably, the high-melting-point fiber has a melting point of 180° C. above, for example in the range of 190° C. to 230° C., preferably in the range of 215° C. to 230° C. or above. The low-melting-point fiber has a melting point ranging from 115° C. to 130° C. or below. In this case, the heating temperature may be set in a range of about 140° C. to 150° C., and the cooling temperature may be set in a range of about 10° C. to 15° C.

The heating treatment preferably comprises blowing vertically hot air to the upper and lower surfaces of the fabric blank so as to allow passage of the hot air through the fabric blank, in order that the low-melting-point short fiber inside the fabric blank is better heated. The cooling treatment is preferably performed in a very short time. For example, a cooling roller of 200 kg may be applied gravitationally or hydraulically (for instance for a felt fabric having a bigger gram weight) to press downwardly against the fabric blank so that the cooling is carried out at a faster rate. In this way, the fabric blank can be cooled down from about 150° C. to about 15° C. in 5 to 15 seconds to densify the fabric.

If desirable, the obtained felt fabric can be pleated in order to form a filer medium in a pleated shape, as shown in FIG. 3.

A Model A Shore Durometer is used to measure the hardness of the felt fabric of the invention. It is found that the hardness of the felt fabric is up to 50 to 80 HA, which is sufficient for supporting the felt fabric itself and allows the formation of pleats.

Apart from the needle punch method, water jet punch, thermal-bonding, air-laid, wet processing and stitch-bonding methods can be used to form the fabric blank.

The water jet punch is a process in which high pressure fine water streams are ejected to one or more layers of fiber so that the fibers are inter-entangled with each other to strengthen the fiber web.

The thermal-bonding is a process in which a fibrous or powdered thermal-bonding reinforced material is added into a fiber web, the fiber web is heated to melt and then cooled down to solidify into the fabric.

The air-laid is a process in which wood fiber board are loosened into a state of singular fiber, and the fiber is then air-laid to congregate and form a web, the fiber web is strengthened into the fabric.

The wetting processing is a process in which various fiber materials are loosened into a state of singular fiber in water and blended to form a fiber suspension, the suspension is fed to a web forming machine where the wet fiber forms a web and is strengthened into the fabric.

The needle punch is a process in which one or more loose fiber webs are interlocked through the punch action applied by the needles to become strengthened to the extent of forming the fabric.

The stitch-bonding is a process in which warp knitted loop structure is used to strengthen fiber web, yarn layer, non-textile materials (such as plastic film or metal foil) or combinations thereof to form a nonwoven fabric.

The above methods are well known in the art and therefore not described in details herein.

The nonwoven felt fabric of the invention is characterized by good filterability, permeability, absorption, hardness/rigidity, mouldability, light weight, pleatability, and ability to withstand repeated pulsing of the cleaning air or fluids and/or the impact from the cleaning air or fluids, is therefore suitable to be used as a filter medium.

FIG. 4 illustrates a cartridge filter 100 having a filter medium made of the nonwoven felt fabric of the invention. In particular, the nonwoven felt fabric 20, after being produced according to the method described above, can be subjected to a pleat treatment to make pleats 22 thereon, and then rolled up to form a cylinder having two open ends on which two end caps 24, 26 are mounted, respectively. One of the end caps may be closed, if necessary. In the case that the felt fabric having the sandwich structure discussed above is used to form the cylindrical filter medium, the layer of high-melting-point fiber is facing the gas or fluid to be treated. In this embodiment, the end caps 24, 26 are made of stainless steel and take annular shape. Because of the high rigidity and hardness of the felt fabric, the filter of FIG. 4 requires no supporting frame for the felt fabric 20. This not only reduces the material costs for producing the filter and the operation costs for changing the filter, but also simplifies the mounting of the fabric onto the end caps. The cartridge filter of the invention can significantly reduce the costs in comparison with the existing cartridge filters. The pleats made on the felt fabric of the invention is not vulnerable to collapse at the apex as do the spunbond pleated nonwoven fabric, and therefore can maintain the filtration area of the cylindrical filter medium. If the pleats are spread wide enough, the bridging of dust would be decreased, allowing for easy cleaning when pulsed.

Figures 5, 6:
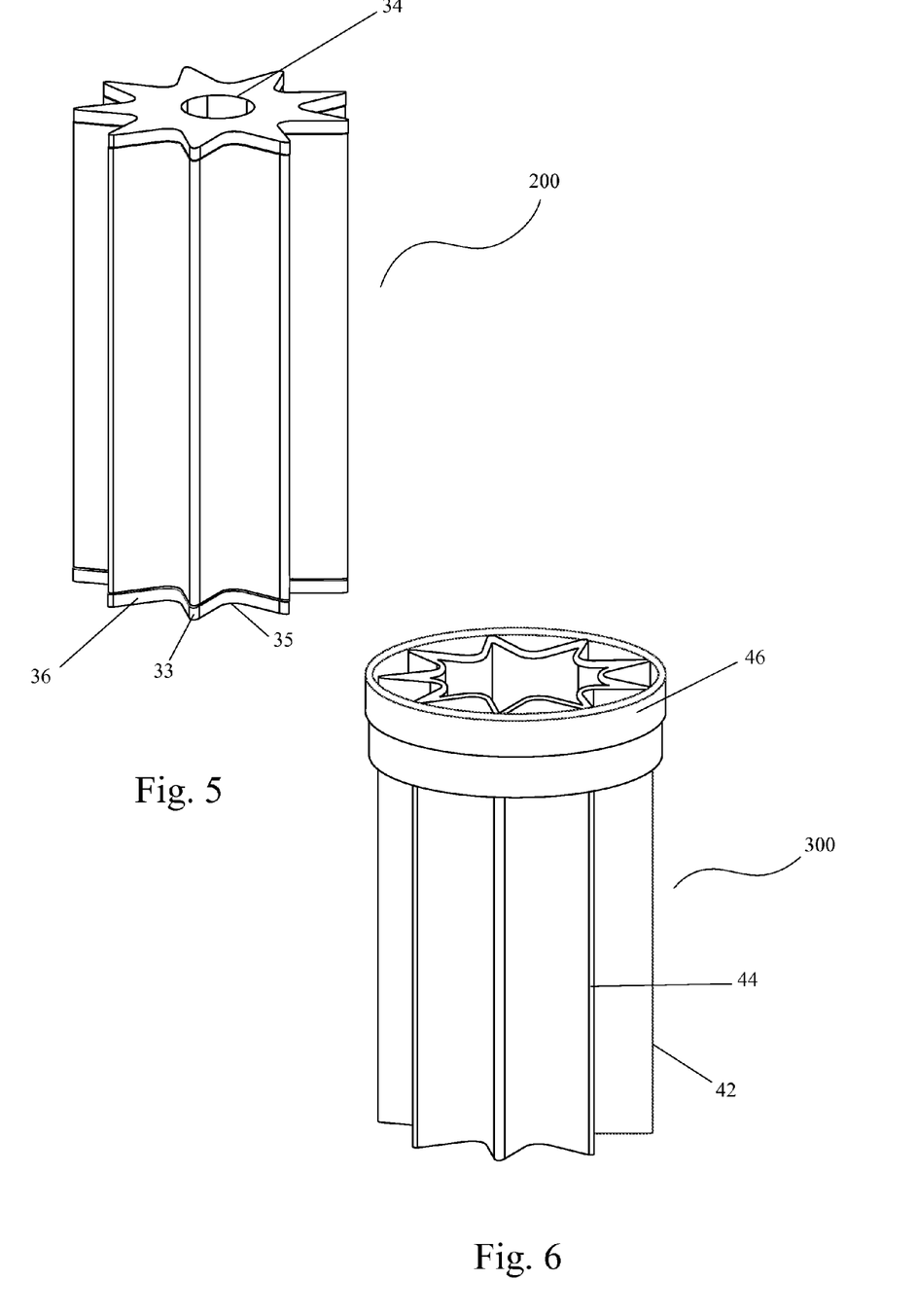
FIG. 5 is a perspective view of another cartridge filter formed with the nonwoven felt fabric of the invention.
FIG. 6 is a perspective view of a bag filter formed with the nonwoven felt fabric of the invention.

An improvement of the cartridge filter is illustrated in FIG. 5. In particular, the cartridge filter 200 differs from the cartridge filter 100 shown in FIG. 4 in that the end caps 34, 36 are molded from the felt fabric of the invention. As illustrated, the end caps have a surface profile corresponding to a cross sectional configuration of the pleated cylinder, such that the end caps 34, 36 are profiled to form a plurality of humps 33 and cavities 35 that are in alignment with the apexes of the pleats and the channels between the adjacent pleats, respectively. This arrangement would facilitate the drop down of the dusts along the channels of the cylindrical filter medium and the cavities of the end caps, and would not deposit on the end caps, allowing for further reduced operation costs for cleaning the end caps and the cylindrical filter medium.

As an alternative, PTFE (polytetrafluoroethylene) membrane and acrylic coatings can be applied to the surface of the felt fabric of the invention, in order to increase the smoothness of the fabric. This is also beneficial to brush off and clean the dust attached to the cylindrical filter medium.

Figure 7:
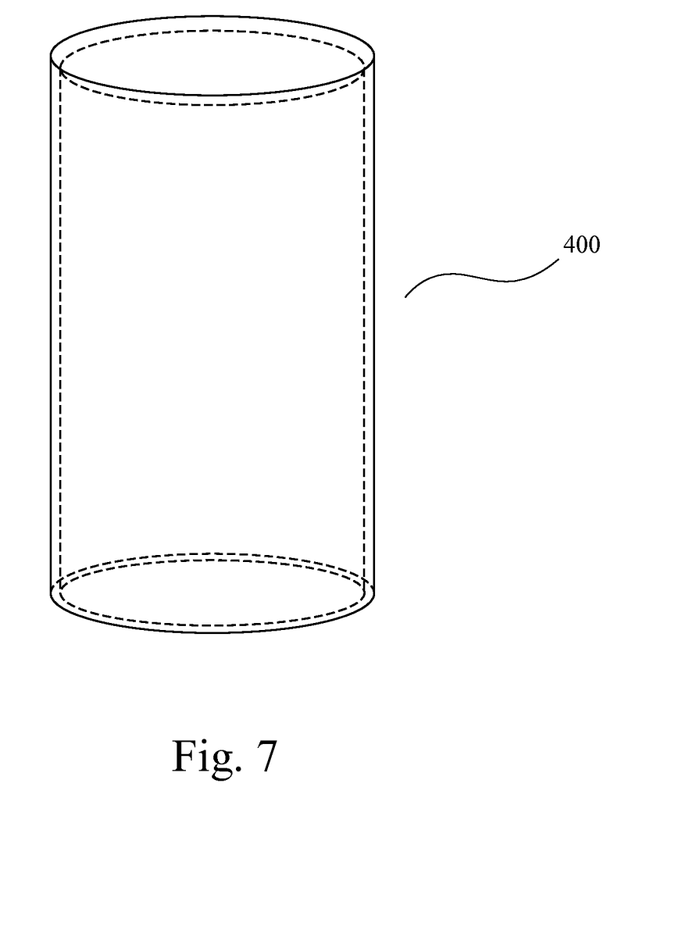
FIG. 7 is a perspective view of another bag filter formed with the nonwoven felt fabric of the invention.

FIGS. 6 and 7 illustrate two different bag filters of the invention. The conventional bag filters generally comprise a flexible filter bag and a support structure in the form of a basket on the inside of the filter bag to prevent the filter bag to collapse due to the process gas flow from the outside to the inside of the bag. To mount a conventional bag filter, it is necessary to snap the filter bag into place, and then an appropriate size of support structure is dropped into the filter bag for support. This design is labor intensive when installing and changing the filter bag.

FIG. 6 is a bag filter 300 having a filter medium made from the felt fabric of the invention. As illustrated, the bag filter 300 comprises a filter bag 42 made from the felt fabric of the invention. In particular, the felt fabric of the invention is pleated to form pleats 44, and then rolled up to a cylindrical shape with the opposite sides being sealed to obtain the filter bag 42. Or the mouldability of the felt fabric of the invention is taken advantage of by moulding the felt fabric into a pleated shape, the moulded felt fabric is then rolled up to a cylinder shape with the opposite sides being sealed to obtain the filter bag 42. The filter bag 42 has a closed bottom, and a snap band top 46 for securing the bag and allowing the clean gas to flow out. Since the felt fabric of the invention exhibits excellent rigidity and mouldability, and can retain its shape when it is molded into any shape or configuration, the bag filter 300 of the invention can eliminate the need for any other support structure. Again, this not only reduces the material costs for producing the support structure and the operation costs for changing and repairing the filter, but also simplifies the mounting and changing of the filter bag.

An improvement of the bag filter is illustrated in FIG. 7. As illustrated, the bag filter 400 comprises a cylinder with a closed end and an open end, wherein the cylinder, the closed end and the open end are moulded integrally from the felt fabric of the invention. Since the felt fabric of the invention exhibits excellent rigidity and mouldability, and can retain its shape when it is molded into any shape or configuration, the obtained bag filter 400 of the invention can have a high impact resistance and thus a dimension stability.

FIGS. 8 to 11 illustrate a CGR plate filter made from the felt fabric of the invention. It is known in the art that a conventional CGR (Caulked, Gasketed, Recessed) plate filter generally comprises a supporting plate and two pieces of filter cloth attached to two sides of the supporting plate, wherein the supporting plate has a endless grove formed on the perimeter thereof and a central through hole; the filter cloth consists of a sewn in a cord around the perimeter edge of the cloth. To fix the filter cloth, it is required to feed the cloth through the central through hole of the supporting plate from one side so that each filter cloth is stretched over the surface of the supporting plate, and the edge with the cord is forced (for example hammered) into the endless grove of the supporting plate in order to effectively prevent a capillary seepage phenomenon. The manufacture, mounting and changing of the conventional CGR plate filter are involved with sewing and caulking the edge of the perimeter edge of the cloth, sewing up the cord and hammering it into the groove of the supporting plate, feeding the filter cloth through the central through hole of the supporting plate and then stretching out and the like, all of which are time consuming and labor intensive, but also greatly increase the costs and prolong the production cycle. In addition, damage to the filter cloth often occurs when the cloth is mounted onto the supporting plate, which possibly makes the cloth unusable.

The CGR plate filer made from the felt fabric of the invention is illustrated in FIGS. 8 to 11. This CGR plate filter 500 comprises a first filter element 52, a second filter element 54 that is opposite to the first filter element 52, and a supporting plate 56 that has a central through hole 57 and is arranged between the first and second filter elements 52, 54. The first and second filter elements 52, 54 and the supporting plate 56 all are moulded as one piece from the felt fabric of the invention, respectively. The supporting plate 56 is substantially same in structure as the plate of the conventional CGR plate filter. Each of the first and second filter elements 52, 54 comprises a filter element body 51, an extended central core 53 formed on the body 51, and a semicircular flange 55 formed on a perimeter edge of the body 51. The extended central core 53 and the flange 55 protrude outwardly from a same side of the body 51.

Figure 9:
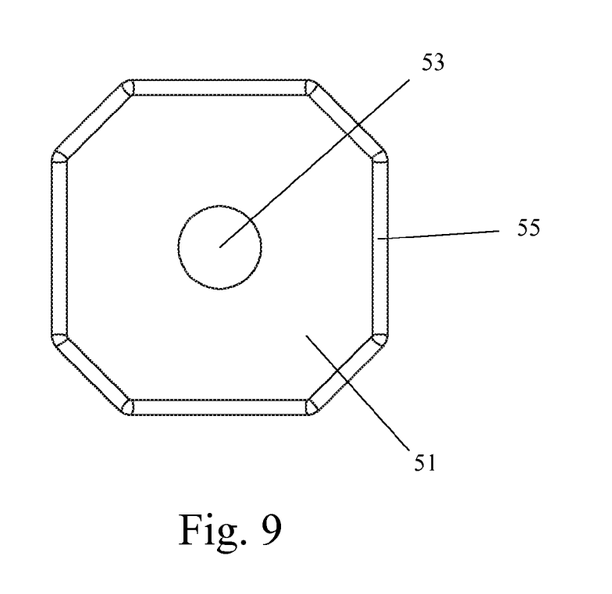
FIG. 9 is a front elevation view of two filter elements of the CGR plate filter formed integrally with the nonwoven felt fabric of the invention.

However, the central core of the second filter element 54 has a diameter smaller slightly than a diameter of the central core of the first filter element 52, such that the central core of the second filter element 54 snugly passes through and is meshed with the central core of the first filter element 52. In this embodiment, the filter element body 51, the central core 53 and the semicircular flange 55 are molded as one piece from the felt fabric of the invention.

Figure 8:
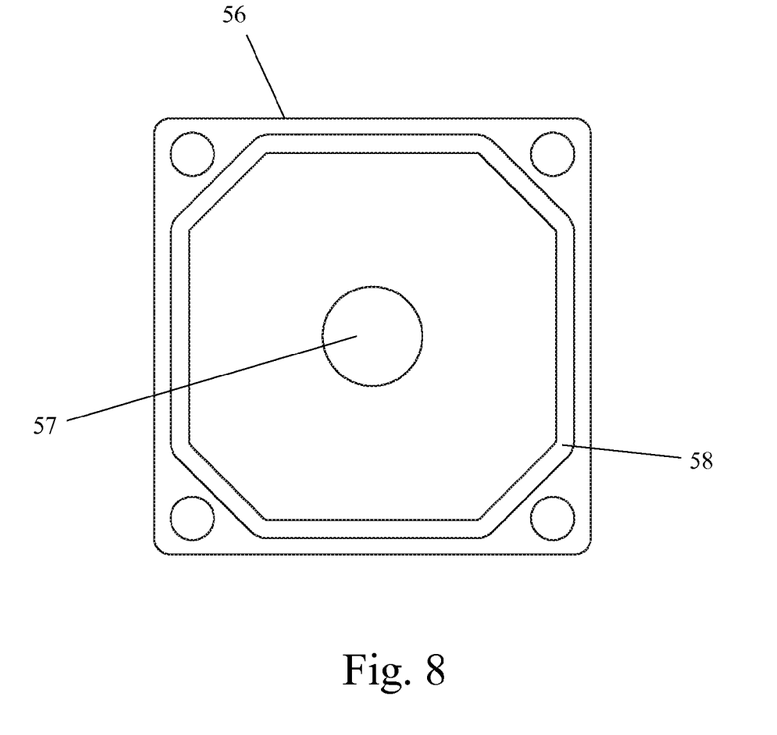
FIG. 8 is a front elevation view of a supporting plate of a CGR plate filter formed integrally with the nonwoven felt fabric of the invention.

The central core of the first filter element 52 is shaped and dimensioned such that this central core snugly passes through the through hole 57 of the supporting plate 56, and the central core of the second filter element 54 is shaped and dimensioned such that this central core snugly passes through and is meshed with the central core of the first filter element 52. The semicircular flanges of the first and second filter elements 52, 54 are shaped and sized such that they are snugly received in and fixed within an annular groove 58 formed on the perimeter of each side of the supporting plate 56, respectively.

As discussed above, the felt fabric of the invention exhibits excellent rigidity and hardness as well as remarkable mouldability, the first filter element 52, the second filter 54 and the supporting plate 56 moulded from the felt fabric can stably retain their respective shapes. To assemble the CGR plate filter 500, it is only required to pass the central core 53 of the first filter element 52 from one side of the supporting plate 56 through the through hole 57, and snap the semicircular flange 55 into and receive in the annular groove 58. Then, the central core 53 of the second filter element 54 is allowed to pass from the other side of the supporting plate 56 through the through hole 57 and the central core of the first filter element 52 in a manner that the central core of the second filter element 54 is meshing inside the central core of the first filter element 52 to form a barrel neck. Likewise, the semicircular flange 55 of the second filter element 54 is snapped into and received in the annular groove 58 on the other side of the supporting plate 56. The whole assembly process of the CGR plate filter 500 may be made reference to FIGS. 10 and 11.

Figure 10:
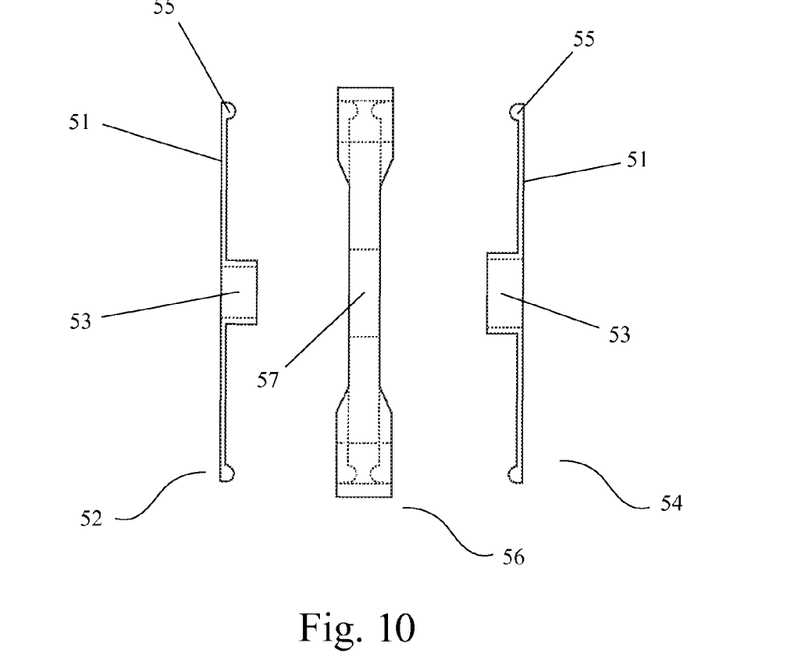
FIG. 10 is a schematic diagram showing that the filter elements shown in FIG. 9 and the supporting plate shown in FIG. 8 are ready to be assembled into the CGR plate filter.
Figure 11:
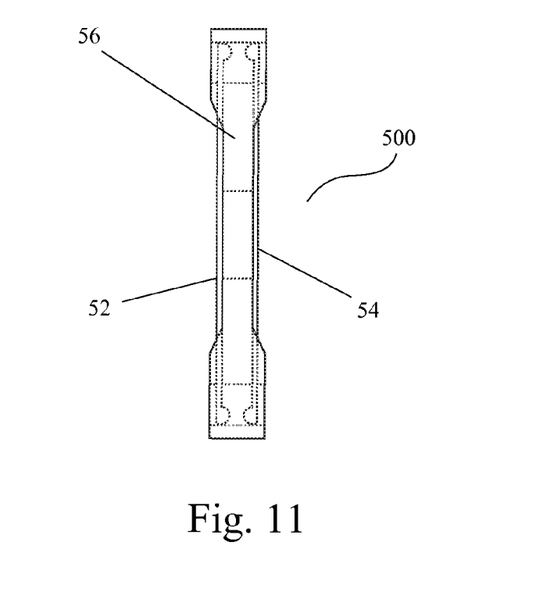
FIG. 11 is a side view of the CGR plate filter after the assembly shown in FIG. 10 is completed.

As can be seen, the CGR plate filter 500 eliminates the need for the caulking process by forming the filter elements to fit the shape of the plate and snapping the edges of the filter elements into the groove which is held in place by tension. The CGR plate filter 500 also eliminates the process of feeding and stretching out the filter cloth. Therefore, the labor intensity and costs for implementing, assembling and changing the filter is greatly reduced. Moreover, the first filter element and the second filter element are independent from each other, so either of the two elements can be changed or handled individually.

Figure 12:
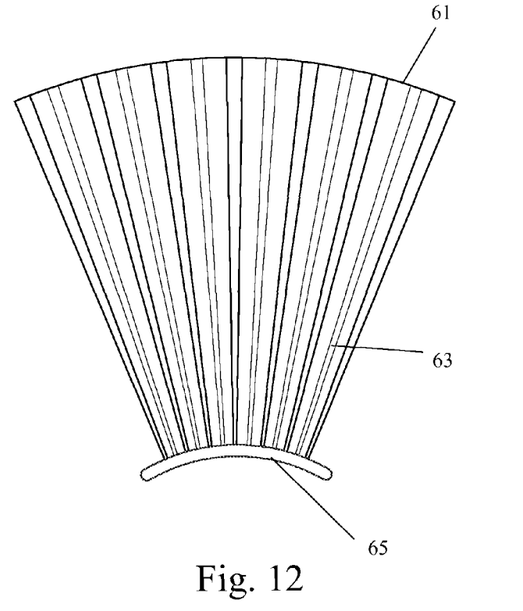
FIG. 12 is a front elevation view of a supporting plate for use in a rotary disc filter which is formed integrally with the nonwoven felt fabric of the invention.
Figure 13:
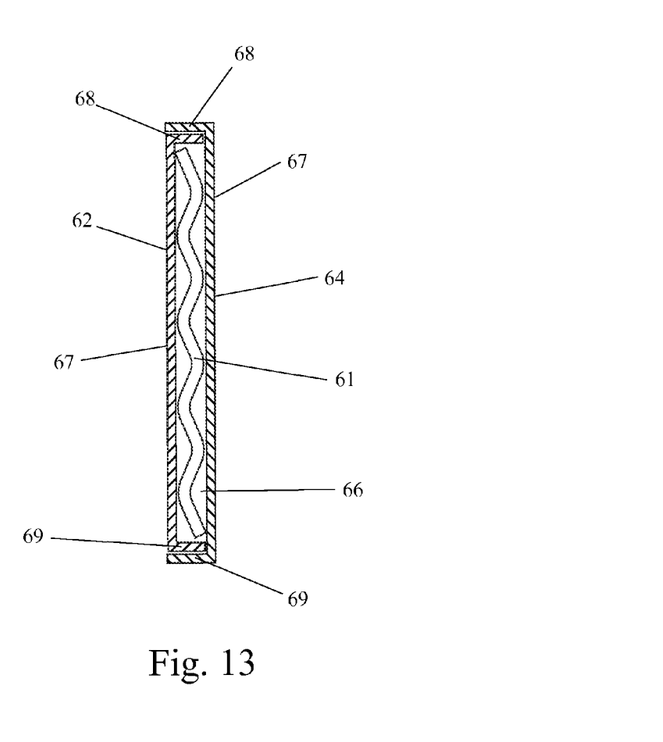
FIG. 13 is a side view of a chamber created by meshing two filtration walls with each other, in which the supporting plate shown in FIG. 12 is received, the filtration walls being formed with the nonwoven felt fabric of the invention.

FIGS. 12 and 13 illustrate a filter sector of a rotary disc filter, which is made from the felt fabric of the invention. It would be well known in the art that the disc filter is generally used in heavy duty applications such as the liquid-solid separation of iron ore and coal industries, and is made up from a plurality of filter sectors which are clamped together to form the disc. Each filter sector comprises a filter bag and a supporting plate on the inside of the filter bag to support the filter bag. Channels for guiding the filtrate to flow toward to a filtrate outlet are formed on the supporting plate. However, the supporting plate of the prior art disc filter is made of metal and therefore very heavy, which leads to intensive labor in mounting, maintaining, conveying and changing the filter sectors.

The felt fabric of the invention has the advantages of light weight, high rigidity and hardness, mouldability and shape maintenance, hence the supporting plate molded from the felt fabric of the invention permits a lower weight significantly but has the rigidity enough to support the filter bag. In addition, the supporting plate of the invention is capable of retaining its shape while providing sufficient compressive strength. In the mean time, the supporting plate of the invention can be moulded to radially form a plurality of channels for guiding the filtrate to flow toward the filtrate outlet, as shown in FIG. 12. Generally, the weight of the supporting plate molded from the felt fabric of the invention is reduced by about one third to one fourth with respect to the weight of the metal supporting plate currently used in the prior art. Thus, implementing the supporting plate of the invention would be less labor-intensive.

As a variation of the filter sector according to the invention, the felt fabric of the invention is molded into a first filtration wall 62, a second filtration wall 64 which is opposite the first filtration wall 62. The first and second filtration walls 62, 64 are meshed with each other to form a filtrate chamber 66 for receiving filtrate that flows through the first and second filtration walls, as shown in FIG. 13. In this embodiment, the supporting plate 61 of FIG. 12 received in the filtrate chamber 66 is also made from the felt fabric of the invention, which is profiled to radially form a plurality of channels 63 for guiding the filtrate to flow toward a filtrate outlet 65.

The first and second filtration walls 62, 64 are shaped such that they are meshed with each other to form the closed filtrate chamber 66. Referring to FIG. 13, an example of the closed chamber formed by meshing the first and second filtration walls 62, 64 with each other is illustrated. Each of the first and second filtration walls 62, 64 has a vertical surface 67, and upper side surface 68 and lower side surface 69 horizontally extending from upper and lower ends of the vertical surface 67 on the same side, respectively. The upper and lower side surfaces 68, 69 of the first filtration wall 62 and the upper and lower side surfaces 68, 69 of the second filtration wall 64 are sized and shaped such that they are snap attached together in an intimate manner, and would not separate from each other. To assemble the filter sector, the supporting plate is sandwiched between the first and second filtration walls, and then the upper and lower side surfaces of the first filtration wall and the upper and lower side surfaces of the second filtration wall are snap attached together to form the filtrate chamber.

While the embodiments described herein are intended as exemplary nonwoven felt fabric and its production as well as the filter made from the felt fabric, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A stand-alone nonwoven needle-punch felt fabric is made of at least one low-melting-point short fiber and at least one high-melting-point short fiber of same type or different types, wherein the low-melting-point short fiber is rendered to become molten and gets tangled up in the high-melting-point short fiber, the fabric is stiff enough to be self-sustaining and has the ability to maintain its shape, and the fabric is also mouldable, and when the fabric is molded into any shape or configuration, the molded shape or configuration is retained in use under an external pressure; and wherein the nonwoven felt fabric has a gram weight ranging from 500 g/m$^2$ to 2000 g/m$^2$, wherein the nonwoven felt fabric consists of a single layer of fiber formed by evenly blending the low-melting-point short fiber and the high-melting-point short fiber.

2. The nonwoven needle-punch felt fabric as claimed in claim 1, wherein the low-melting-point short fiber has a melting point ranging from 115° C. to 130° C., and the high-melting-point short fiber has a melting point ranging from 180° C. to 230° C.

3. The nonwoven needle-punch felt fabric as claimed in claim 1, wherein each of the low-melting-point short fiber and the high-melting-point short fiber is selected from the group consisting of polyesters, terylene, polypropylene, nylon, acrylic, polyamide fibres, rayon fibres, acrylic fibres, polyethylene, and polyvinyl chloride.

4. The nonwoven needle-punch felt fabric as claimed in claim 1, wherein the nonwoven felt fabric has a shore A hardness of up to 50-80 HA.

5. The nonwoven needle-punch felt fabric as claimed in claim 1, wherein the nonwoven felt fabric is pleatable.

6. The nonwoven needle-punch felt fabric as claimed in claim 1, wherein the nonwoven felt fabric comprises from about 20% to 50% of the low-melting-point short fiber based on a total weight of the nonwoven felt fabric, and from about 50 to 80% of the high-melting-point short fiber based on the total weight of the nonwoven felt fabric.

7. The nonwoven needle-punch felt fabric as claimed in claim 6, wherein the nonwoven felt fabric comprises from about 30% to 40% of the low-melting-point short fiber based on the total weight of the nonwoven felt fabric, and from about 60 to 70% of the high-melting-point short fiber based on the total weight of the nonwoven felt fabric.

8. The nonwoven needle-punch felt fabric as claimed in claim 1, wherein the nonwoven felt fabric is produced by forming a fabric blank of the low-melting-point short fiber and the high-melting-point short fiber; subjecting the fabric blank to a heating treatment at a temperature that is higher than a melting point of the low-melting-point short fiber but lower than a melting point of the high-melting-point short fiber, so that the low-melting-point short fiber is heated into a molten state to get tangled up in the high-melting-point short fiber; and cooling down quickly the fabric blank.

9. A filter comprising the nonwoven needle-punch felt fabric as claimed in claim 1 used as the material of a filter medium of the filter.

10. The filter as claimed in claim 9, wherein the filter is the type of cartridge filter having a cylinder formed with the nonwoven felt fabric as the filter medium, and the cylinder is self-sustaining.

11. The filter as claimed in claim 10, wherein the cylinder is pleated to be in a pleated shape.

12. The filter as claimed in claim 11, wherein the filter further comprises end caps formed with the nonwoven felt fabric as claimed in claim 1, the end caps are moulded to have a surface profile corresponding to a cross sectional configuration of the pleated cylinder.

13. The filter as claimed in claim 9, wherein at least one layer of polytetrafluoroethylene membrane or acrylic coating is applied to a surface of the nonwoven needle-punch felt fabric.

14. The filter as claimed in claim 9, wherein the filter is the type of bag filter, the nonwoven felt fabric is moulded into a shape of bag as the filter medium, and the filter bag is self-sustaining.

15. The filter as claimed in claim 9, wherein the filter is the type of bag, and the nonwoven felt fabric is pleated and then rolled up into a shape of bag as the filter medium, and the filter bag is self-sustaining.

16. The filter as claimed in claim 9, wherein the filter is the type of CGR filter plate, comprising a first filter element, a second filter element that is opposite to the first filter element, and a supporting plate that has a central through hole and is sandwiched between the first and second filter elements, and wherein the first and second filter elements are moulded from the nonwoven needle-punch felt fabric.

17. The filter as claimed in claim 16, wherein each of the first and second filter elements comprises a body, an extended central core formed on the body, and a flange formed on a perimeter edge of the body; the extended central core and the flange protrude outwardly from a same side of the body; and the body, the extended central core and the flange are moulded integrally from the nonwoven needle-punch felt fabric;
the central core of the first filter element is shaped and dimensioned such that this central core snugly passes through the central through hole of the supporting plate, and the central core of the second filter element is shaped and dimensioned such that this central core snugly passes through and is meshed with the central core of the first filter element; and
the flanges of the first and second filter elements are shaped and sized such that they are snugly received in a groove formed on a perimeter of the supporting plate.

18. The filter as claimed in claim 9, wherein the filter is the type of rotary disc filter that is constituted of a plurality of filter sectors, each of the filter sectors comprises a first filtration wall made of the nonwoven felt fabric, a second filtration wall made of the nonwoven felt fabric and opposite the first filtration wall, and a filtrate chamber formed between the first and second filtration walls for receiving filtrate that flows through the first and second filtration walls.

19. The filter as claimed in claim 18, wherein the filter sector further comprises a supporting plate received in the filtrate chamber, the supporting plate is moulded from the nonwoven felt fabric and is profiled to radially form a plurality of channels for guiding the filtrate to flow toward a filtrate outlet.

20. The filter as claimed in claim 18, wherein the first and second filtration walls are shaped such that they are meshed with each other to form the filtrate chamber which is closed.

21. A rotary disc filter comprising a plurality of supporting sectors which are clamped together to form the disc filter, and a plurality of filter bags which envelope the supporting sectors respectively, and wherein the supporting sectors are moulded from the nonwoven felt fabric as claimed in claim 1.

22. The rotary disc filter as claimed in claim 21, wherein the supporting sector is profiled to radially form a plurality of channels for guiding the filtrate to flow toward a filtrate outlet.

23. A method for producing a nonwoven felt fabric according to claim 1, comprising the steps of:
1) blending evenly at least one low-melting-point short fiber and at least one high-melting-point short fiber of same type or different types in a desired ratio to obtain a single layer of fiber, or to obtain a plurality of fibers with at least one layer of low-melting-point short fiber and at least one layer of high-melting-point short fiber arranged alternately;
2) carding the blended fiber on a carding machine;
3) feeding the carded fiber into a web forming machine to produce a fiber web;
4) subjecting the fiber web to a forming treatment to form a fabric blank;

5) heating the fabric blank at a temperature that is higher than a melting point of the low-melting-point short fiber but lower than a melting point of the high-melting-point short fiber, so that the low-melting-point short fiber melts while the high-melting-point short fiber remains unmelted; and 6) cooling down the heated fabric blank to solidify the melted low-melting-point short fiber, so as to obtain the nonwoven felt fabric.

24. The method as claimed in claim 23, wherein in the step of heating, the low-melting-point short fiber is melted into a molten state so that the molten low-melting-point short fiber gets tangled up in the high-melting-point short fiber, and the high-melting-point short fiber remains unmelted, thereby the fabric blank is structured by sandwiching the molten low-melting-point short fiber between the unmelted high-melting-point short fiber.

25. The method as claimed in claim 23, wherein the low-melting-point short fiber has a melting point ranging from 115° C. to 130° C., and the high-melting-point short fiber has a melting point ranging from 180° C. to 230° C., the heating is performed at a temperature ranging from 140° C. to 150° C., and the cooling is performed at a temperature ranging from 10° C. to 18° C.

26. The method as claimed in claim 23, wherein the heating comprises blowing vertically hot air to upper and lower surfaces of the fabric blank so as to allow passage of the hot air through the fabric blank, in order that the low-melting-point short fiber inside the fabric blank is heated.

27. The method as claimed in claim 23, wherein the cooling comprises applying a cooling roller which is gravitationally or hydraulically pressed downwardly against the fabric blank to enable the cooling at a fast speed.

28. The method as claimed in claim 23, wherein the nonwoven felt fabric is pleated to make pleats thereon.

29. The method as claimed in claim 23, wherein the forming treatment is selected from the group consisting of processes of needle punch, water jet punch, thermal-sealing, thermal-bonding, air-laid, wet processing and stitch bonding.

* * * * *